D. CONLAN, Jr.
ELECTRIC FIXTURE.
APPLICATION FILED NOV. 8, 1915.
1,252,403.
Patented Jan. 8, 1918.
2 SHEETS—SHEET 2.
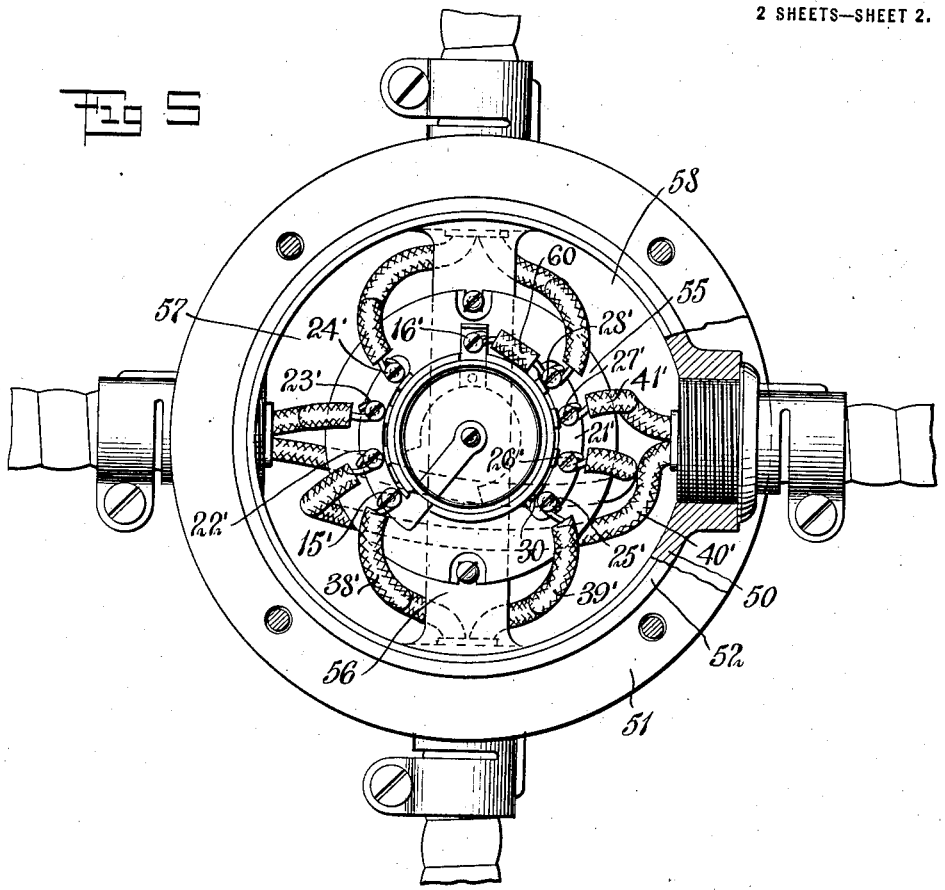
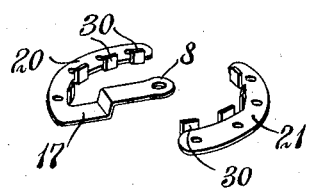
Inventor
David Conlan Jr.
By Attorney

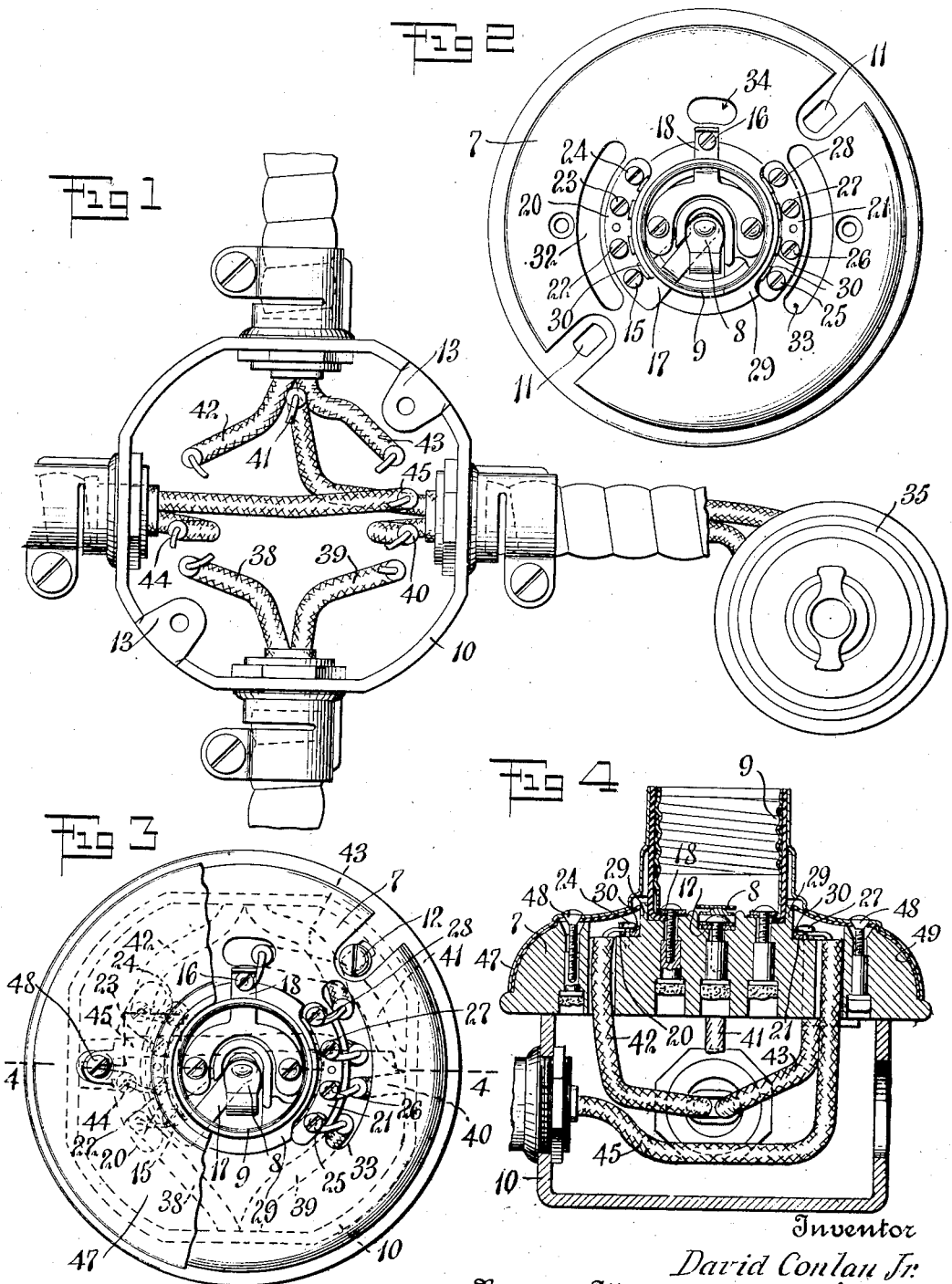

UNITED STATES PATENT OFFICE.

DAVID CONLAN, JR., OF NEW YORK, N. Y.

ELECTRIC FIXTURE.

1,252,403.  Specification of Letters Patent.  Patented Jan. 8, 1918.

Application filed November 8, 1915. Serial No. 60,192.

*To all whom it may concern:*

Be it known that I, DAVID CONLAN, Jr., a citizen of the United States of America, residing at New York city, New York, have invented a new and useful Electric Fixture, of which the following is a specification.

The primary object of my present invention is to do away with the necessity for splicing and soldered joints now employed in making connections at outlet boxes between main and branch conductors.

Present day requirements in the effort to enforce positive electrical connections and thorough insulation demand that all joints at outlet boxes between the mains and the branches be soldered and taped. The results attained depend upon the skill and thoroughness of the electrician installing the work and aside from these elements of uncertainty the joints are frequently injured and broken by the bending necessary in forcing the completed joints back into the bottom of the box. Furthermore, the heat of the blow torch or other means used in the soldering operation, confined as it is more or less within the narrow limits of the box, burns and has the effect of charring and softening the insulation on the wires, causing frequent short circuits and insulation weakness and breakdowns.

By my invention I have overcome and eliminated the above mentioned and other faults and objections, in a practical and efficient way, by means of a special outlet fixture carrying terminals for the fixture and in addition to these, terminals to receive the ends of the branch wires entering the box.

The branch terminals are electrically connected, either directly or indirectly, with the fixture terminals and may be in the form of binding screws carried by bus bars mounted on the insulating base of the fixture.

According to the present preferred embodiment of the invention, one of these bus bars is directly connected with and may, in fact, form a part of one of the fixture terminals and the other bus bar is adapted to be connected with the other fixture terminal, for instance by means of a short "jumper" or through outside connections embodying say a switch for controlling the outlet fixture. The bus bars are so located on the outlet fixture as to facilitate the engagement of the wire ends therewith and preferably they are mounted on the front of the fixture where the wires can be easily handled, this construction also leaving a free wire space in the bottom of the box, thereby avoiding all cramping or crowding of the wires entered in the box.

Various other features of the invention and details of construction will appear as the specification proceeds and will be made clear by consideration of the accompanying drawings which illustrate several practical embodiments of the invention.

In the drawings:

Figure 1 is a plan view of a typical junction box installation with the wire ends arranged ready to be engaged with the fixture shown in Fig. 2.

Fig. 2 is a plan view of an outlet fixture in the form of a lamp socket, constructed in accordance with and embodying the invention.

Fig. 3 is a plan view showing the fixture applied to the junction box, the cover of the fixture being broken away to better illustrate the manner of making the different connections.

Fig. 4 is a sectional view taken substantially on the line 4—4 of Fig. 3.

Fig. 5 is a plan view illustrating the invention embodied in a marine type of fixture.

Fig. 6 is a detached perspective view of the two bus bars providing the two sets of branch terminals.

The invention is capable of embodiment in many different forms of outlet fixtures, but for the sake of simplicity of illustration, I have shown it herein as embodied in a lamp socket type of fixture, the same consisting in general of a suitable porcelain or other insulating base 7, carrying the center lamp contact 8, and the side or shell contact 9.

This fixture is so constructed as to be readily applicable to an ordinary outlet box. In the first form illustrated, the fixture is constructed for application to a type of outlet box 10 much used in house-wiring, and the fixture is in this instance shown applied to the box by making the base of the fixture larger than the outlet box so as to rest on the rim of the box and form a closure to the same and by providing said base with openings 11 through which securing screws 12 are passed into engagement with screw seats provided in the lugs 13 carried by the rim of the box.

The two fixture terminals are designated 15 and 16, and they consist in the present disclosure, of binding devices in the form of screws engaged in shanks or plates 17 and 18 which are electrically connected with the center and side contacts respectively of the fixture.

The two sets of branch terminals are, in the present form of the invention, mounted on the front of the base at opposite sides of the screw shell contact, and are provided by the two bus bars 20 and 21 carrying the two sets of binding devices in the form of the screws 22, 23, 24, and 25, 26, 27, 28. These bus bars are illustrated as curved so as to fit in close to the shell contact and take up no more room than necessary on the base and are shown as separated from the shell contact by curved insulating walls 29 projected up from the base. The bus bars may be further provided with an upstanding wall or lugs 30 coöperating with the heads of the binding screws to hold the wire ends firmly in place.

The two sets of branch terminals are connected directly or indirectly with the two fixture terminals. In the present disclosure the first bus bar 20 is electrically connected with and made a part of the shank portion 17 of the first fixture terminal and the other bus bar 21, while not directly connected with the other fixture terminal is adapted to be connected therewith either through the medium of a short "jumper" or for instance through the medium of external connections such as are used for a switch for controlling the fixture.

When, as in the preferred form, all the connections are made on the front of the fixture, passages have to be provided for bringing the wires up to the binding devices on the front of the fixture base. In the first form illustrated, where the fixture base covers the entire open side of the box, passages for the wires are provided by forming openings such as those indicated at 32 and 33 along side the bus bars and extending through the base from the back to the front thereof. Separate wire passages may be provided for bringing the wire ends to the fixture terminals. Only one of such passages, 34, is illustrated and that is connected with the fixture terminal 16.

In using the invention with a typical junction box installation such as that illustrated in Fig. 1, and embodying the four-way connections including a switch 35 for controlling the outlet fixture, the wire ends are first usually bared and then bent up as indicated in Fig. 1 approximately in a position to pass up through the proper wire passages in the base of the fixture when the fixture is applied to the box. In the case illustrated the two feed wires 38 and 39 are brought up through the passages 32 and 33 respectively in the base and engaged with the terminals 15 and 25 respectively. The wire 40 and 41 from the switch are brought up through the wire passages 33 and 34 and engage with the terminals 26 and 16, respectively. The two branch wires 42 and 43 extend up through the passages 32 and 33 and are engaged with the branch terminals 24 and 28 respectively. The two branch wires 44 and 45 are brought up through the passages 32 and 33 and engage with the branch terminals 22 and 27 respectively. The outlet fixture is now in circuit, controlled by the switch and the two branches are in circuit with and supplied with current from the main feed wires.

By this construction the branch connections are easily made, are fully open to inspection, and while rigidly and firmly made, can at any time be readily changed about or disconnected. The bottom of the outlet box is left free with plenty of room for the wiring, and the wires entering the box may be left of considerable length to allow for possible breakages at the ends of the wires, etc. On account of this freedom from connection within the box, it is possible also with my invention to employ a smaller size outlet box than has heretofore been possible. Also this free space in the bottom of the box permits of the wires being drawn out and scraped at the front of the box and then pushed back down into the box until just enough end is left to be engaged with the terminal device.

When the several connections are, as in the preferred form, all made at the front of the fixture, a suitable insulating cover is preferably applied over them to protect them from outside interference. Such a cover is illustrated in Figs. 3 and 4, it being shown as consisting of a metallic protective cover 47 secured over the base by screws 48 and having an insulating lining 49 covering the terminals. A cover thus constructed thoroughly protects the terminal both mechanically and electrically, and the removal of the cover instantly exposes all of the terminals.

In Fig. 5 I have shown the invention embodied in a marine type of fixture, embodying a box body 50 and a fixture supporting ring 51 applied thereto and provided with an upstanding flange indicated at 52 adapted to receive the usual tight fitting marine globe and guard.

The fixture base 55 is, in this case, shown supported on a transversely extending bar 56 carried by the ring 51 and disposed above the bottom of the box so as to leave the free wiring space in the bottom of the box. another special feature of this fixture as illustrated is that the base of the fixture is made smaller than the diameter of the box so as to leave the wiring passages 57 and 58 around the edges of the base at opposite sides of the supporting bar 56.

The wiring illustrated in this case is slightly different from that first disclosed to bring out the fact that when no switch is employed for controlling the outlet fixture, all wires other than the feed wires may be employed as branch conductors. Thus the feed wires 38' and 39' are shown connected to the terminals 15' and 25', as before, but here the branch wires 40' and 41' are shown connected to the terminals 22' and 27' of the two bus bars and the other fixture terminal 16' is shown connected by a jumper 60 with the terminal 28' of the second bus bar 21'. In this case it will be seen that the outlet fixture is thus always in circuit and that the three branches are taken off from the main feed circuit.

It will be evident that various methods of wiring may be adopted to meet particular requirements.

What I claim is:

1. The combination with a junction box, of an outlet fixture applied to said junction box comprising an insulating base and outlet contacts mounted on said insulating base, fixture terminals on said insulating base connected with the outlet contacts, a set of branch terminals mounted on said insulating base and connected with one of the fixture terminals and a second set of branch terminals mounted on the insulating base and separated from the first set of branch terminals.

2. An outlet fixture comprising an insulating base, center and side lamp contacts mounted on said base, fixture terminals electrically connected to said contacts, one of said terminals having an extension disposed at one side of the side contact and constituting a bus bar, a second bus bar mounted on the base at the opposite side of the side contact and terminal devices on said bus bars.

3. An outlet fixture for application to a junction box or the like, comprising an insulating supporting base, center and side lamp contacts mounted centrally on said insulating base, fixture terminals electrically connected with said lamp contacts, bus bars mounted on the insulating supporting base at opposite sides of the side lamp contact, one of said bus bars being electrically connected with one of the lamp contacts and the other of said bus bars being electrically disconnected from the other lamp contact and line terminals on said other lamp contact and said disconnected bus bar for enabling connection of said lamp contact and bus bar by a suitable conductor.

4. An outlet fixture comprising an insulating base adapted for application to a junction box, outlet contacts mounted on the central portion of said insulating base, said insulating base having passages therethrough at opposite sides of said outlet contacts, bus bars mounted on the insulating base alongside of the passages therethrough, a plurality of wire terminals on each of said bus bars, whereby wires may be passed through said openings from the back of the insulating base and be secured to said bus bars on the front of the insulating base, electrical connections from one of the bus bars to one of the outlet contacts and the other bus bar and outlet contact having means by which they may be electrically connected.

5. An outlet fixture comprising an insulating base adapted for application to a junction box, outlet contacts on said insulating base, fixture terminals on the insulating base electrically connected with said outlet contacts, a bus bar on the insulating base electrically connected with one of the fixture terminals and provided with a plurality of line terminals, a second bus bar mounted on the insulating base and electrically disconnected from the other fixture terminal and line terminals on said second bus bar and said other fixture terminal, enabling connection of said bus bar and the fixture terminal through the agency of connecting wires or the like.

DAVID CONLAN, Jr.